United States Patent [19]
Okabayashi

[11] Patent Number: 5,652,614
[45] Date of Patent: Jul. 29, 1997

[54] VIDEO SERVER APPARATUS COMPRISING OPTICAL DISKS, HARD DISK DRIVE AND MAIN MEMORY

[75] Inventor: Ichiro Okabayashi, Takatsuki, Japan

[73] Assignee: Matsushita Electric Industrial Co., Ltd., Osaka, Japan

[21] Appl. No.: 633,618

[22] Filed: Apr. 17, 1996

[30] Foreign Application Priority Data

Apr. 24, 1995 [JP] Japan ................... 7-098202

[51] Int. Cl.⁶ ............................. H04N 7/173
[52] U.S. Cl. .................. 348/7; 348/12; 455/4.2; 455/5.1; 395/200.09
[58] Field of Search ................... 348/7, 12, 13, 348/6, 10, 11; 455/4.2, 5.1, 6.1, 6.2; 395/200.09, 840, 841, 282, 283, 444, 484; H04N 7/16, 7/173

[56] References Cited

U.S. PATENT DOCUMENTS

| | | |
|---|---|---|
| 5,311,423 | 5/1994 | Clark. |
| 5,341,474 | 8/1994 | Gelman et al. ............ 395/200 |
| 5,383,112 | 1/1995 | Clark. |
| 5,442,390 | 8/1995 | Hooper et al. ............ 348/7 |
| 5,453,779 | 9/1995 | Dan et al.. |
| 5,461,415 | 10/1995 | Wolf et al.. |
| 5,583,561 | 12/1996 | Baker et al. ............ 348/7 |

FOREIGN PATENT DOCUMENTS

5-35407   2/1993   Japan.

*Primary Examiner*—Michael H. Lee
*Assistant Examiner*—Chris Grant
*Attorney, Agent, or Firm*—Panitch Schwarze Jacobs & Nadel, P.C.

[57] ABSTRACT

Image and sound data stored in an optical disc unit having an medium auto-changer mechanism are read out and temporarily stored in a hard disk unit, after then supplied to a user's terminal unit via a memory which serves as an output buffer. The image and sound data are stored in the memory, by compressing and a time length required to read out the data is shorter than a reproduction time in the user's terminal unit, and therefore plural data are read out by a difference between a readout time and the reproduction time. Since write operation to the hard disk unit and readout operation from the hard disk unit to write to the main memory 3 are simultaneously carried out, plural hard disk units are disposed and accessed in parallel. Moreover, a unit of data in write operation is larger than a unit of data in readout operation in the hard disk unit.

7 Claims, 7 Drawing Sheets

VIDEO SERVER APPARATUS COMPRISING OPTICAL DISKS, HARD DISK DRIVE AND MAIN MEMORY

FIELD OF THE INVENTION AND RELATED ART STATEMENT

1. Field of the Invention

The present invention relates to a video server apparatus which has a large memory capacity, stores digitalized image and sound data and transmits the data to users in compliance with demands of the users.

2. Description of the Related Art

Attention is being focused recently on multimedia; and a video server apparatus which distributes a program such as a motion picture by a demand of a user becomes the center of public attention. It is a reason that the video server apparatus has an interactive property which is important to succeed in the multimedia.

Figure 9:
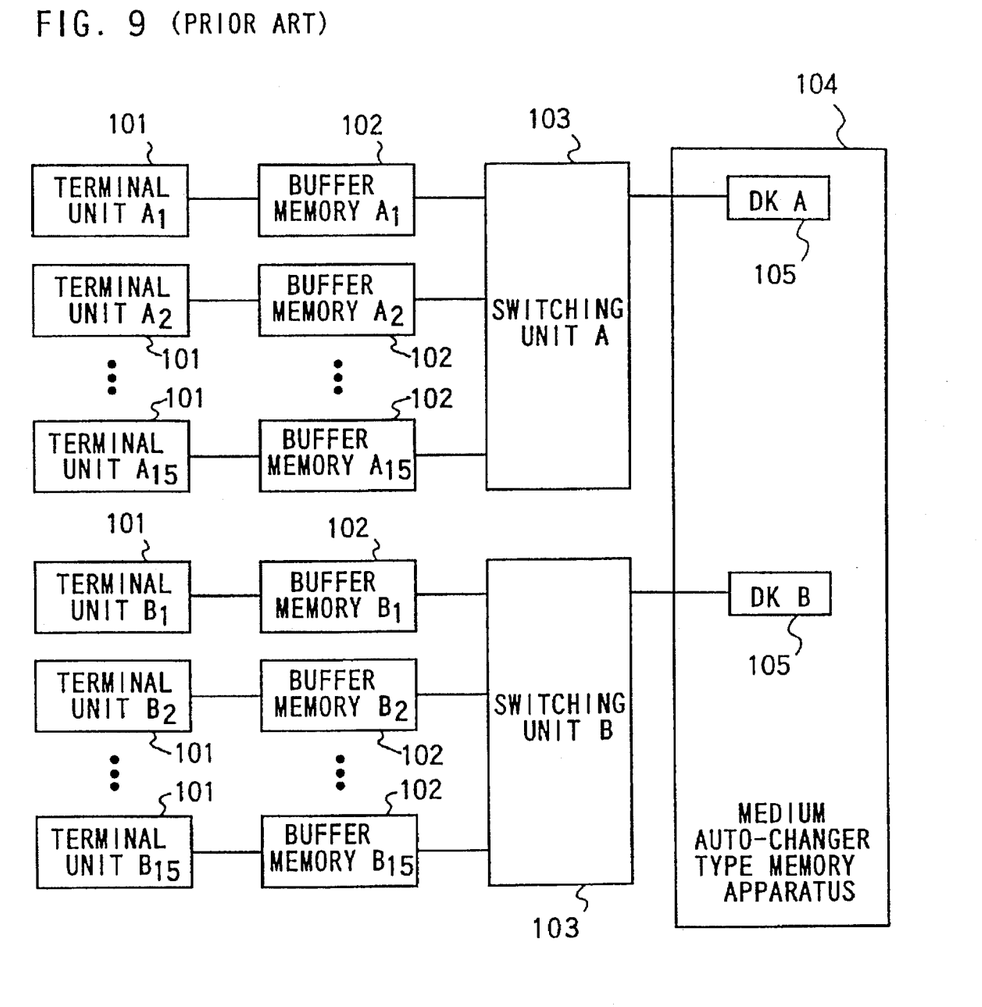
FIG. 9 is the block diagram of the video server apparatus in the prior art.

The video server apparatus in the prior art is described hereafter with reference to FIG. 9.

FIG. 9 shows a configuration of the video server apparatus in the prior art. This video server apparatus is disclosed under a title of an information library system in the Japanese Published Unexamined Patent Application Hei 5-35407.

Referring to FIG. 9, in a memory apparatus 104 of medium auto-changer type, a selected optical disc is loaded on an optical disc unit 105 in compliance with a demand of a user. Video data read out from the optical disc unit 105 is supplied to a terminal unit 101 through a buffer memory 102 which serves as an FIFO (first-in-first-out device).

In order to respond to demands of plural terminal units 101, the memory apparatus 104 of the medium auto-changer type exchanges the optical disc of the optical disc unit 105 by a time-division multiplex operation. Switching units 103 distributes reproduced image data of the optical disc to the buffer memories 102 by the time-division multiplex operation.

Since a transfer time for transferring the video data from the memory apparatus 104 of medium auto-changer type to the buffer memory 102 is shorter than a reproduction time in the terminal units 101, the video data can be supplied to the plural terminal units 101 from one optical disc unit 105 within a time difference between the transfer time and the reproduction time.

In the above-described configuration, there is a problem that a system cost is expensive.

First, the switching unit 103 for switching the video data of the optical disc unit 105 and the buffer memories 102 which are disposed in respective terminal units 101 must be provided. Furthermore, dedicated lines for connecting among these units are required. In other words, a dedicated configuration is required for the video server apparatus.

Additionally, the buffer memories 102 having large memory capacities are required. In the video server apparatus of the prior art, the data corresponding to 300 seconds of the reproduction time must be stored per one buffer memory 102. In the MPEG 2 of a standardized specification of image compression, the data of 4 megabits per seconds (0.5 megabytes) are required, and therefore, the data of 150 megabytes are required for 300 seconds.

The buffer memory 102 is expensive, because it is a large scale semiconductor device. Since the buffer memory 102 is configured by the FIFO as mentioned above, it becomes further expensive in comparison with a memory for general purpose. Such an expensive memory must be mounted on each terminal unit. Consequently, in the prior art, the system cost becomes very expensive.

OBJECT AND SUMMARY OF THE INVENTION

An object of the present invention is to provide a video server apparatus which is inexpensive in a system cost and can cope with many users.

The video server apparatus in accordance with the present invention comprises a processor for controlling operations, a first interface apparatus connected to the processor, a memory connected to the first interface apparatus, a second interface apparatus connected to the first interface apparatus, a memory apparatus of a medium auto-changer type which is capable of exchanging a memory medium and connected to the second interface apparatus, a middle memory connected to the second interface apparatus, and an input-output control unit connected to the second interface apparatus.

The input-output control unit is connected to an external line, and the data read out from the buffer memory apparatus of the medium auto-changer type are temporarily stored in the middle memory. After then, the data are transferred to the memory through the first and second interfaces and stored therein. The data stored in the memory are output to the external line from the input-output control unit through the first interface. The middle memory has a middle cost, a middle speed and a middle capacity.

In operation, the memory medium of the memory apparatus of medium auto-changer type is exchanged in a first period, and the data which are transferred from the intermediate memory to the memory are switched in a second period. The data which are transferred from the memory to the external line through the input-output control unit are switched in a third period. Data transfer from the memory apparatus of the medium auto-changer type to the middle memory and data transfer from the middle memory to the second interface apparatus are carried out by time-division multiplex operation.

Furthermore, in the video server apparatus of the present invention having the above-mentioned configuration, when N, M and L are defined by integers of one or more, a unit of data transfer of the memory of medium auto-changer type to the middle memory is N blocks, and a unit of the data transfer from the middle memory to the second interface apparatus is M blocks. The data of N blocks are transferred in the first period, and the data of M blocks are transferred in the second period. The second period is L times of the first period, and the integer M is L times of the integer N.

According to the present invention, the video server apparatus configured as mentioned above is inexpensive in the system cost and can cope with commands of many users.

The video server apparatus of the present invention comprises an optical disc apparatus having a medium auto-changer mechanism which is inexpensive and slow but has a large capacity and a semiconductor memory which is expensive and fast but has a small capacity. A hard disk unit having a middle property is disposed between the optical disc apparatus and the semiconductor memory which are serve as output buffers.

Since a readout time which is required to read out from the optical disc apparatus is shorter than a reproduction time in a user's terminal apparatus, plural image and sound data can be supplied on the basis of a difference between the readout time and reproduction time.

A memory capacity of the output buffer can be reduced by temporarily storing the video and sound data read out from the optical disc apparatus into the hard disk. In this operation, a high efficiency of operation is realized by selecting a unit of the write operation which is larger than a unit of readout operation in the hard disk unit.

DESCRIPTION OF THE PREFERRED EMBODIMENT

Preferred embodiments of the present invention will be described hereafter with reference to FIG. 1–FIG. 8.

First Embodiment

The video server apparatus of the first embodiment of the present invention is described with reference to FIG. 1–FIG. 7.

Figure 1:
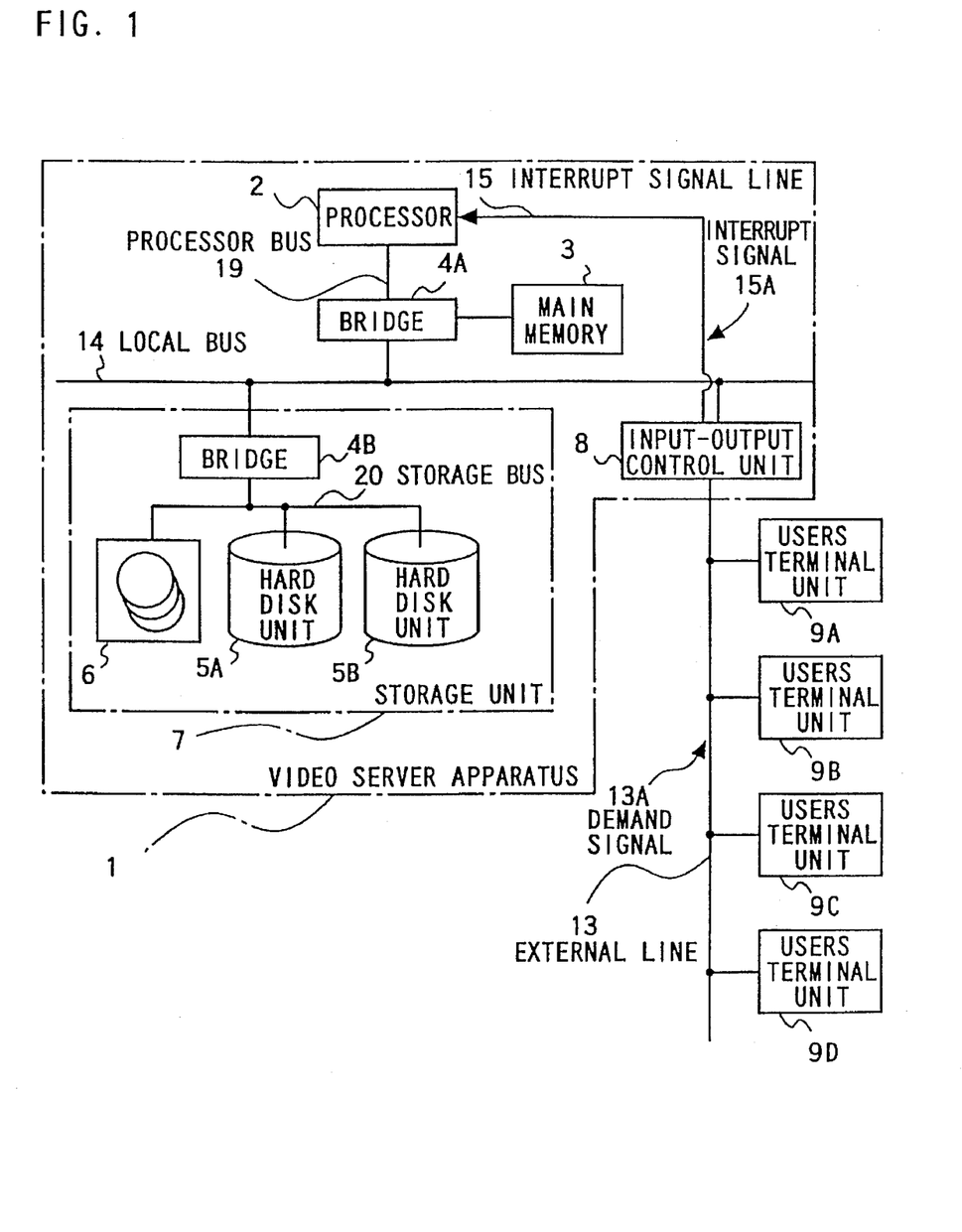
FIG. 1 is a block diagram of the video server apparatus and the user's terminal units in accordance with a first embodiment in the present invention.
Figure 2:
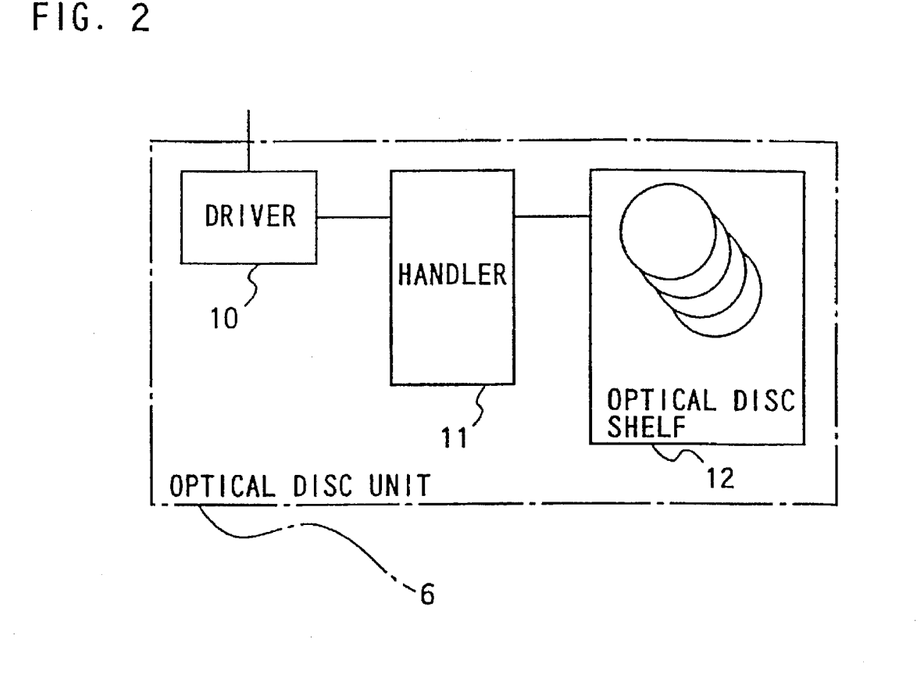
FIG. 2 is a detailed block diagram of an optical disc unit in FIG. 1.
Figure 3:
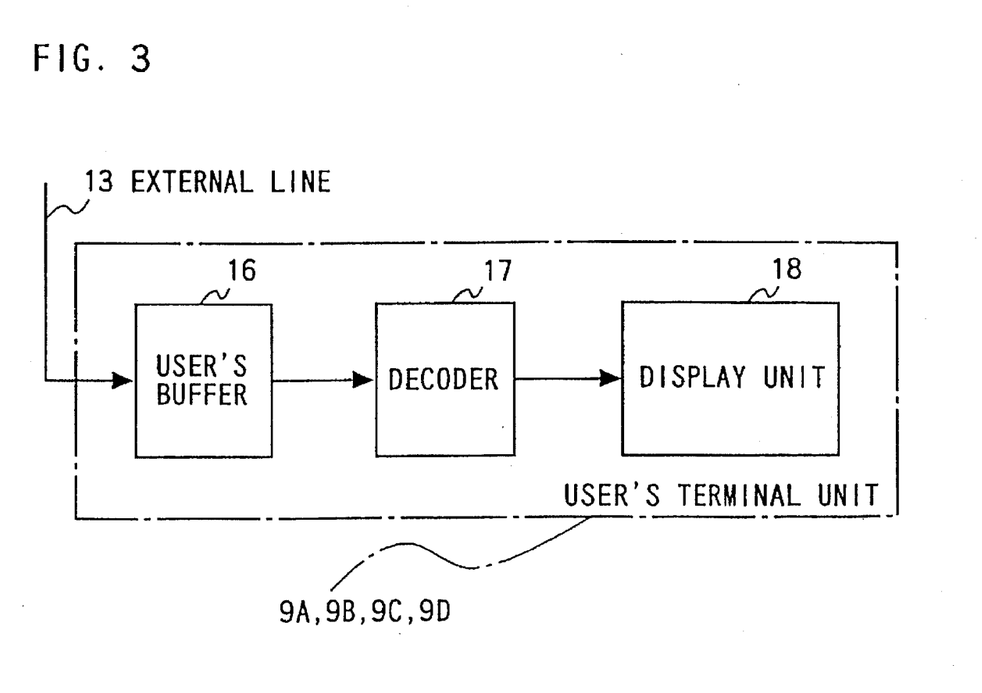
FIG. 3 is a detailed block diagram of a user's terminal unit in FIG. 1.
Figure 4:
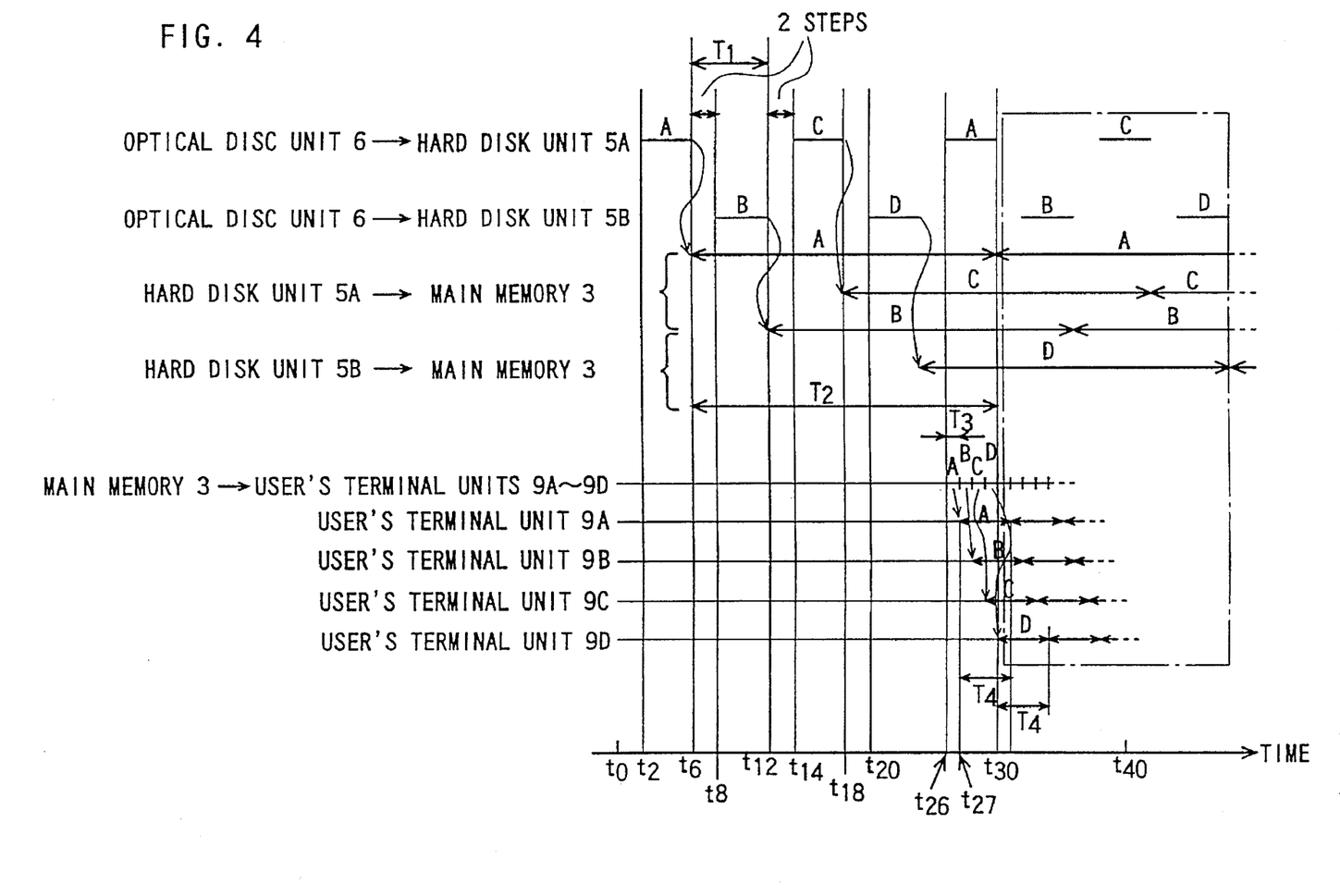
FIG. 4 is a timing chart of overall operation in the first embodiment.
Figure 5:
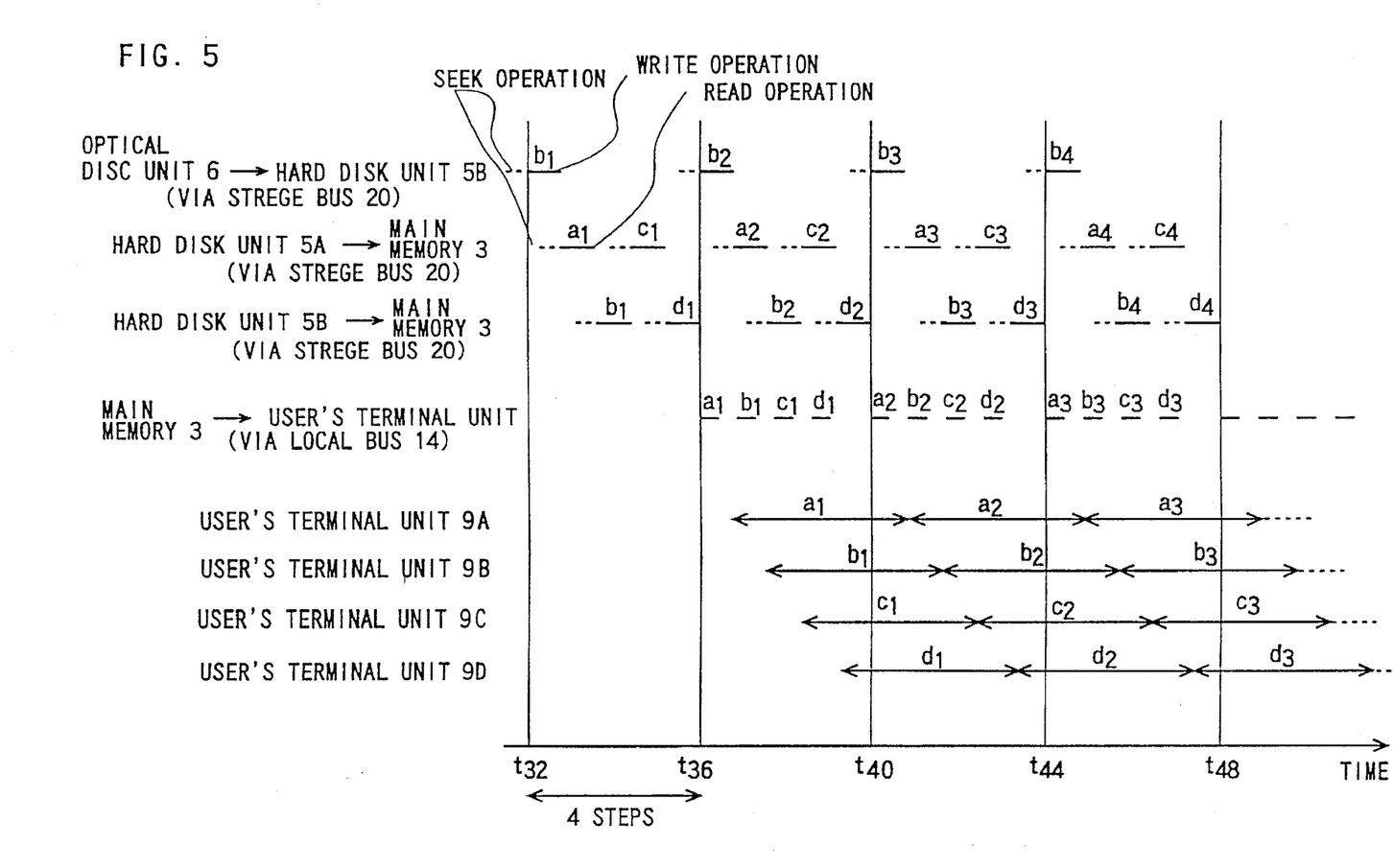
FIG. 5 is a timing chart of a detailed operation in the first embodiment.
Figure 6:
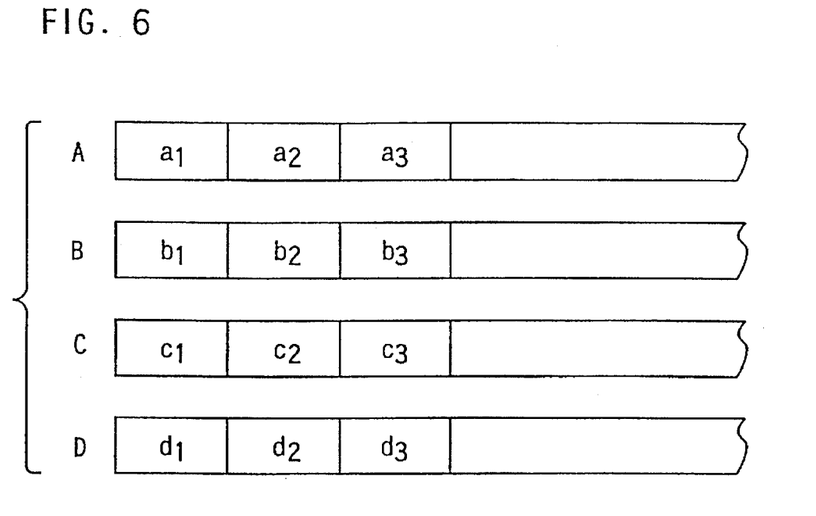
FIG. 6 is a diagram representing data configurations in the first embodiment.
Figure 7:
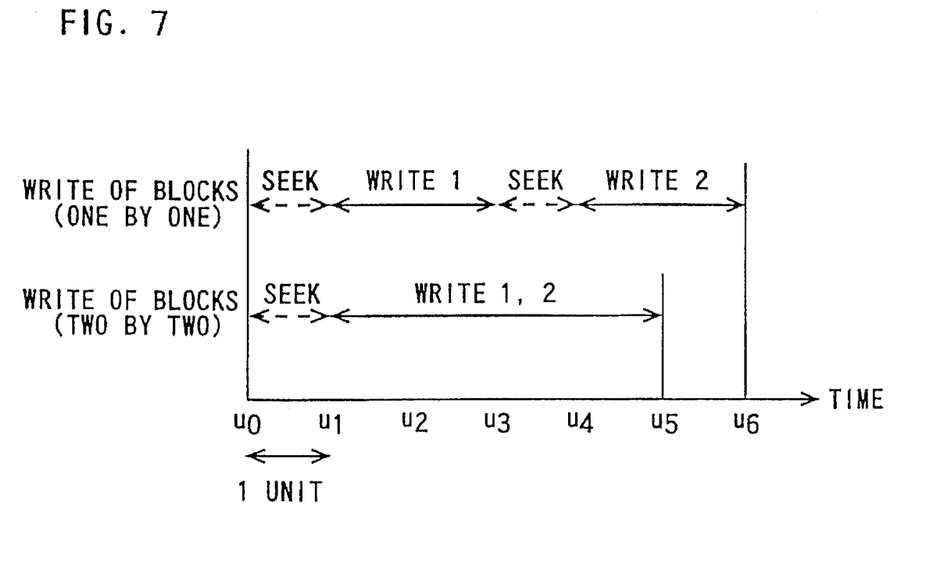
FIG. 7 is a timing chart of a write operation in a hard disk unit.

FIG. 1 is a block diagram of the video server apparatus 1 and user's terminal units 9A–9D in the first embodiment. FIG. 2 is a detailed block diagram of an optical disc unit 6 in FIG. 1. FIG. 3 is a detailed block diagram of the user's terminal units 9A, 9B, 9C and 9D in FIG. 1. FIG. 4 is a timing chart showing operation of the first embodiment. FIG. 5 is a detailed timing chart enlarging an area surrounded by a chain line in FIG. 4. FIG. 6 is a diagram representing video data segments in the first embodiment. FIG. 7 is a timing chart of a write operation in a hard disk units 5A and 5B.

Referring to FIG. 1, the video server apparatus 1 comprises a processor 2, and control of all operations is carried out by the processor 2. Main memory 3 is a main memory and serves as an output buffer of the processor 2. A processor bus 19 of processor 2 and a bus of the main memory 3 are connected by a bridge 4A as a first interface apparatus. The bridge 4A is connected to a bridge 4B as a second interface apparatus through a local bus 14. Hard disk units 5A and 5B having hard disk memories are connected to the bridge 4B through a storage bus 20. An optical disc unit 6 comprising a medium auto-changer mechanism as a memory apparatus of medium auto-changer type is connected to the hard disk units 5A and 5B and the bridge 4B through the storage bus 20. A storage unit 7 comprises the optical disc unit 6, the hard disk units 5A and 5B and the bridge 4B. An input-output control unit 8 which serves as an interface for an external line 13 is connected between the local bus 14 and the external line 13. The user's terminal unit 9A–9D are connected to the external line 13. An interrupt signal line 15 communicates between the input-output control unit 8 and the processor 2.

Referring to FIG. 2, the optical disc unit 6 comprises a driver 10, a handler 11 and an optical disc shelf 12.

Referring to FIG. 1, all the user's terminal units 9A–9D have identical configurations, and therefore, description is made only on the user's terminal unit 9A as a representative of the user's terminal units 9A–9D. Referring to FIG. 3, the user's terminal unit 9A comprises a user's buffer 16, a decoder 17 and a display unit 18.

A basic operation of the video server apparatus 1 configured as mentioned above is described with reference to FIG. 1, FIG. 2 and FIG. 3.

A large number of recording mediums in which image and sound data are recorded by digitalizing and compressing are stored in the optical disc shelf 12 of the optical disc unit 6. The recording medium is an optical disc, for example. Hereafter, the image and sound data are called "video data".

When a user having the user's terminal unit 9A wishes to watch a program, a demand signal 13A is sent to the input-output control unit 8 from the user's terminal unit 9A via the external line 13. The input-output control unit 8 sends an interrupt signal 15A to the processor 2 via the interrupt signal line 15, and informs the demand of the user. The processor 2 sends an instruction of transfer of video data to the storage unit 7. Video data read out from the storage unit 7 are temporarily stored in the main memory 3, and thereafter are transferred to the user's terminal unit 9A from the input-output control unit 8 via the external line 13.

In the above-mentioned operation, the bridges 4A and 4B connect between or disconnect from different buses. For example, when the processor 2 uses the main memory 3, processor bus 19 is disconnected from the local bus 14 by the bridge 4A. Therefore, other unit can use the local bus 14. Moreover, since the local bus 14 is disconnected from the storage bus 20 by the bridge 4B, data transfer can be carried out between the optical disc unit 6 and the hard disk units 5A and 5B, and simultaneously the processor 2 can use the local bus 14. A connection manner among the processor 2, the main memory 3 and the bridge 4A is identical with that of the personal computer, and can be realized by an inexpensive device.

An object of the present invention is to transmit the video data from the storage unit 7 to the external user's terminal units 9A–9D. A detailed description is made with respect to these units.

The optical disc unit 6 is capable of automatically exchanging the optical disc of the recording medium. A plurality of optical discs in which the video data are recorded are stored in the optical disc shelf 12. The driver 10 records the video data to the optical disc and reproduce the video data from the optical disc. The recording operation is carried out in the case of renewal of stored data. In the present embodiments, only reproduction operation is described.

The handler 11 changes an optical disc of the driver 10 so as to return an optical disc of the driver 10 to the optical disc shelf 12, or take out a requested optical disc from the optical disc shelf 12 and loads it to the driver 10. If an optical disc which is not requested is loaded in the driver 10, the optical disc is returned to the optical disc shelf 12, and a requested optical disc is loaded. The requested optical disc is instructed by the processor 2 which receives a demand signal 13A from the user's terminal unit 9A. An instruction signal is transferred to the optical disc unit 6 via the processor bus 19, the local bus 14 and the storage bus 20.

The video data read out from the optical disc unit 6 is temporarily stored in the hard disk units 5A and 5B. Subsequently, the video data are transferred from the hard disk units 5A and 5B to the main memory 3 through the bridges 4A and 4B. Finally, the video data are read out from the main memory 3, transmitted to the external line 13 through the input-output control unit 8 and is received by the user's terminal unit 9A.

In the user's terminal unit 9A as shown in FIG. 3, the video data received through the external line 13 are temporarily stored in the user's buffer 16. Subsequently, the video data is decoded by the decoder 17, and reproduced by the display unit 18. In the decoding operation, compressed video data are decoded and converted to a format corresponding to an input of the display unit 18, for example an RGB input or a video input.

A difference exists between a time length for reading out the video data from the storage unit 7 and a reproduction time length of the video data in the use's terminal unit 9A. For example, the video data read out from the storage unit 7 in five seconds are reproduced by the user's terminal unit 9 in twenty seconds. In this case, four programs (20/5=4) of the video data can be read out. A multiple readout is realizable by the above-mentioned principle.

The optical disc unit 6 is inexpensive and slow but has a large capacity. On the contrary, the main memory 3, which is configured by a semiconductor device, is expensive and fast but has a small capacity. The hard disk units 5A and 5B have a middle cost, a middle speed and a middle capacity. Since the user's buffer 16 is disposed in each user's terminal unit 9A, a large capacity is not required but preferable to be inexpensive. In the present embodiment, a system cost can be reduced by a hierarchical structure of memories which combine optimum memories as shown in FIG. 1.

Hereafter, detailed descriptions are made with respect to an operation timing, a multiple readout operation and a capacity of each memory unit.

An overall operation is described with reference to FIG. 4. Referring to FIG. 4, abscissa designates time, and points of time $t_0, t_1, t_2, \ldots$ are shown with a predetermined time intervals. The predetermined time intervals is called a "step". For example, a time interval between a time $t_3$ and a time $t_4$ is one step, and a time interval from the time $t_4$ to a time $t_7$ is three steps. Periods $T_1, T_2, T_3$ and $T_4$ represent time lengths of respective operations. Video data A, B, C and D are sent to user's terminal units 9A, 9B, 9C and 9D, respectively. As shown in FIG. 6, the video data A is composed of video data segments $(a_1, a_2, a_3, \ldots)$. In a similar manner, the video data B, C and D are composed of video data segments $(b_1, b_2, \ldots), (c_1, c_2, \ldots), (d_1, d_2, \ldots)$, respectively. The video data A and C are stored in the hard disk unit 5A, and the video data B and D are stored in the hard disk unit 5B. In order to improve a total throughput, two hard disk units 5A and 5B are used as described above. Detailed operations of the hard disk units 5A and 5B will be described later with reference to FIG. 5.

A multiple readout operation is described with reference to FIG. 4.

[Transfer from the optical disc unit 6 to the hard disk unit 5A]

The video data A is sent to the hard disk unit 5A from the optical disc unit 6 between the time $t_2$ and the time $t_6$. Subsequently, an optical disc including the video data A is replaced with an optical disc including the video data B by operation of the handler 11 between the time $t_6$ and the time $t_8$. The video data B is sent to the hard disk unit 5B from the optical disc unit 6 between the time $t_8$ and a time $t_{12}$. The optical disc including the video data B is replaced with an optical disc including the video data C between the time $t_{12}$ and a time $t_{14}$. The video data C is sent to the hard disk unit 5A from the optical disc unit 6 between the time $t_{14}$ and the time $t_{18}$. In a similar manner, the video data D is sent to the hard disk unit 5B, and the above-mentioned operations are repeated. In the above-mentioned operation, four steps are required to read out the video data, and two steps are required to replace the optical disc. Therefore, the period $T_1$ of replacement of the optical disc is six steps.

[Transfer from the hard disk units 5A, 5B to the main memory 3]

The video data A, B, C and D stored in the hard disk units 5A and 5B are transferred to the main memory 3 which serves an output buffer. The video data A is transferred from the hard disk unit 5A to the main memory 3 between the time $t_6$ at which the video data A is sent to the hard disk unit 5A and a time $t_{30}$ at which a next video data A is sent to the hard disk unit (5A)(period $T_2$ in FIG. 4). The operation is repeated at the period $T_2$. The period $T_2$ is 24 steps. In a manner similar to the video data A, the video data C is read out from the hard disk unit 5A, and the video data B and D are read out from the hard disk 5B. As shown in FIG. 1, since only one storage bus 20 is disposed, data transfer is carried out by a time-division multiplex operation which will be described later with reference to FIG. 5.

Since the period $T_1$ is 6 steps and the period $T_2$ is 24 steps, the period $T_2$ is four times of the period $T_1$. Consequently, four video data A, B, C and D are read out from the optical disc unit 6 in the period $T_2$. In general, when a ratio of the period $T_2$ to the period $T_1$ is N (N is an integer) or more, the number N of video data can be read out from the hard disk units 5A and 5B in the period $T_2$.

[Transfer from the main memory 3 to the user's terminal unit 9A]

Subsequently, the video data is transmitted from main memory 3 to the user's terminal units 9A–9D. Description is made as to operation after a time $t_{26}$ at which the video data A, B, C and D have been stored in the hard disk units 5A and 5B. As shown in FIG. 6, the video data A, B, C and D are divided into the video data segments $(a_1, a_2, \ldots), (b_1, b_2, \ldots), (c_1, c_2, \ldots)$ and $(d_1, d_2, \ldots)$, respectively. These video data segments are transmitted from the main memory 3 to the respective user's terminal units 9A, 9B, 9C and 9D in sequence after the time $t_{26}$, every one step (period $T_3$). The user's terminal unit 9A reproduces the video data segment $a_1$ in 4 steps (period $T_4$) between the time $t_{27}$ and a time $t_{31}$.

Since the period $T_3$ is of 1 step and the period $T_4$ is of 4 steps, the period $T_4$ is four times of the period $T_3$. Therefore, four video segments $a_1, b_1, c_1$ and $d_1$ are read out from the main memory 3 in the period $T_4$.

A detailed operation of the hard disk units 5A and 5B are described with reference to FIG. 5 and FIG. 7. FIG. 5 is an enlarged timing chart of an area surrounded by a chain line in FIG. 4.

The operation of the hard disk units 5A and 5B are divided into a seek operation, a readout operation and a write operation. A seek time is a time length which is required to seek a predetermined access position of the hard disks in the hard disk units 5A and 5B. Data transfer is carried out after the access position is decided. In FIG. 5, a time length which is required to seek is shown by a broken line, and a time length for data transfer is shown by a solid line.

Referring to FIG. 5, five video data segments $b_1, a_1, c_1, b_1$ and $d_1$ are transmitted via the storage bus 20 in 4 steps. The video data segments which are transmitted between the times $t_{32}$ and $t_{36}$ are described in detail. The video data segment $b_1$ is transferred from the optical disc unit 6 to the hard disk unit 5B. The video data segment $a_1$ is transferred from the hard disk unit 5A to the main memory 3. The video data segment $c_1$ is transferred from the main memory 3. The video data segment $b_1$ is transferred from the hard disk unit 5B to the main memory 3. The video data segment $d_1$ is transferred from the hard disk unit 5B to the main memory 3.

In the case that only one hard disk unit 5A is used, the above-described five transfer operations, namely write operation of the video data segment b1 and readout operations of the video data segments $a_1$, $b_1$, $c_1$ and $d_1$ must be operated by one hard disk unit 5A. Such an operation is realizable, but an efficiency is deteriorated because seek and access are repeated in time sequence. In order to improve the efficiency, two hard disk units 5A and 5B are used. The write operation of the video data segment $b_1$ and readout operations of the video data segments $b_1$ and $d_1$ are carried out by the hard disk unit 5B. On the other hand, readout operations of the video data segments $a_1$ and $c_1$ are carried out by the hard disk unit 5A. The seek in one hard disk unit 5B is carried out in readout operation of the other hard disk unit 5A. Consequently, a high speed operation is realized by overlapping the seek and the readout in time. This is a reason to use two hard disk units 5A and 5B. Three or more of hard disk units 5A, 5B . . . are also usable. A suitable configuration may be selected in view of performances of the units. If a high performance is not required, one hard disk unit 5A can attain a satisfactory degree of performance.

Operation from the time $t_{32}$ to a time $t_{40}$ is described hereafter with reference to FIG. 5.

The video data segment $b_1$ is transferred from the optical disc unit 6 to the hard disk unit 5B after the time $t_{32}$. In this transfer, a seek operation in the hard disk unit 5B is completed immediately before the time $t_{32}$ and the transfer starts at the time $t_{32}$.

Subsequently, the video data segments $a_1$, $b_1$, $c_1$ and $d_1$ are read out from two hard disk units 5A and 5B in turn. In the readout operations, a seek time in the hard disk unit 5B overlaps with a readout time in the hard disk unit 5A. For example, a seek time for reading out the video data segment $b_1$ in the hard disk unit 5B overlaps with a readout time of the video data segment $a_1$ in the hard disk unit 5A. The video data segments $a_1$–$d_1$ read out between the times $t_{32}$ and $t_{36}$ are transferred from the main memory 3 to the use's terminal units 9A–9B between the times $t_{36}$ and $t_{40}$. The video data segment $a_1$ is temporarily stored in the user's buffer 16 of the user's terminal unit 9A, and reproduced within a time of 4 steps between the times $t_{36}$ and $t_{44}$.

Data transfer from the hard disk units 5A and 5B to the main memory 3 and data transfer from the main memory 3 to the input-output control unit 8 are carried out via the same local bus 14. Since a transmission ability of the local bus 14 is remarkably higher than that of the storage bus 20, the local bus 14 is capable of carrying out these data transmissions. For example, a transmission ability of the bus which is actually used is 100 MB/s or more in the local bus 14, and 5–20 MB/s in the storage bus 20. Therefore, the transmission ability of the local bus 14 is about ten times of that of the storage bus 20.

There are some conditions in order to realize the above-mentioned operation. For example, as shown in FIG. 4, a ratio of the period $T_2$ to the period $T_1$ ($T_2/T_1$) must be 4 or more. Specifications to realize the above-mentioned operations are listed hereafter.

Letters in parentheses represent "unit", and "MB" represents megabyte, and "s" represents second.

A readout speed of the optical disc unit 6 is 2.4 (MB/s).

A readout speed of the hard disk units 5A and 5B is 4.0 (MB/s).

A time required to exchange a memory medium (optical disc) is 10 (s).

A data rate of a video data segment is 0.5 M(MB/s).

According to the data rate of the video data segment, the video data of 0.5 (MB) is reproduced for one second.

A readout operation from the optical disc unit 6 is described hereafter. Since 10 seconds are required to exchange the optical disc, the periods $T_1$ and $T_2$ of length of about ten seconds are desirable. In the above-mentioned specifications, the period $T_1$ is 70 seconds, and 60 seconds is required to read out and 10 seconds is required to exchange the optical disc. Since the readout speed of the optical disc unit 6 is 2.4 (MB/s), data of 144 (MB)(=2.4×60) can be read out in 60 seconds. Since the data rate of the video data segment is 0.5 (MB/s), the data of 144 (MB) corresponds to 288 seconds (=144/0.5) of reproduction. Therefore, the period $T_2$ is 288 seconds. A ratio of the period $T_2$ to period $T_1$ is 4.1(=288/70), and hence four video data segments can be read out.

The hard disk units 5A and 5B are preferable to store data of 144 (MB) per one user's terminal unit 9A. A data amount of four user's terminal units 9A–9D is 576 (MB), and the data amount of the 576 (MB) can be stored by two hard disk units 5A and 5B each having 288 (MB). On the other hand, in the method of the prior art, the buffer memory 102 of 576 (MB)(=288×2) is required as shown in FIG. 9. If the video server apparatus in the present embodiment is configured by the method in the prior art, as will be described in detail later, a very expensive buffer memory of about 150 (MB) is required per one user's terminal unit to store data corresponding to reproduction of 300 seconds. Consequently, a buffer memory of 600 (MB)(=150×4) is required for four user's terminal units 9A–9D.

The readout operations from the hard disk units 5A and 5B are described hereafter. The periods $T_3$ and $T_4$ are preferably as short as possible in order to reduce the capacity of the expensive main memory 3. A unit of readout is selected to 0.256 (MB). The readout of 0.256 (MB) of data from the hard disk unit 5 takes 0.064(=0.256/4) seconds. Therefore, the period $T_3$ is 0.064 seconds. Video data of 0.256 (MB) is reproduced in 0.512(=0.256/0.5) seconds. Therefore, the period $T_4$ is 0.512 seconds. A ratio of the period $T_4$ to the period $T_3$ is 8(=0.512/0.064). Consequently, eight video data segments can be read out. In the embodiment as shown in FIG. 4, since the number of video data segments is 4, the data transfer in the embodiment is realizable by using two hard disk units 5A and 5B. Since the main memory 3 is required to store data of 0.256 (MB) per one user's terminal unit 9A, the capacity of the main memory 3 is about 1 (MB)(=0.256×4) for four user's terminal units 9A–9D.

In the prior art as shown in FIG. 9, the buffer memory of 576 (MB) is required as mentioned above. On the other hand, in the present embodiment, two hard disk units 5A and 5B of each 288 (MB) and the intermediate main memory 3 of 1 (MB) are required. The buffer memory 102 and the main memory 3 are configured by a semiconductor device. A semiconductor memory is very expensive per memory capacity in comparison with a hard disk memory. A cost of a typical semiconductor memory is 100 to 1000 times of that of the hard disk memory having the same memory capacity as that of the semiconductor memory. In the present embodiment, a memory cost can be greatly reduced by using the hard disk memory.

Furthermore, the buffer memory 102 in the prior art is the FIFO. The FIFO is a two-port memory based on a SRAM, and the cost thereof is several times of that of the DRAM. On the other hand, the main memory 3 in the present embodiment can be configured by an inexpensive DRAM. If the above-mentioned configurations are taken into account, a system cost in the present embodiment is further reduced in comparison with that of the prior art.

As mentioned above, according to the present embodiment, a video server apparatus having a high performance is attainable at a very low cost.

It is not necessarily required that the digitalized data of image and sound are compressed. Plural storage units 7 can be connected to the local bus 14, and plural drivers 10 can be mounted to the optical disc unit 6. The numbers of the optical disc unit 6 and the hard disk units 5A and 5B connected to the storage bus 20 are arbitrarily selected. The number of devices connected to the local bus 14 and the storage bus 20 can be decided in view of transfer abilities of these buses.

Though the main memory 3 is connected to the local bus 14 through the bridge 4A, it can be directly connected to the local bus 14. Another memory may be directly connected to the local bus 14 in addition to the main memory 3 connected to the bridge 4A.

Second Embodiment

The video server apparatus in accordance with a second embodiment of the present invention is described with reference to FIG. 8.

FIGS. 1, 2, 3, 4, 6 and 7 in the first embodiment are commonly referred in the second embodiment. FIG. 8 in the second embodiment corresponds to FIG. 5 in the first embodiment. An abscissa (time axis) in FIG. 8 is designated by the same scale as in FIG. 5. FIG. 8 is a detailed timing chart of the video server apparatus in the second embodiment.

An object of the second embodiment is to carry out operation of the storage bus 20 with a further high efficiency. Others are substantially identical with those of the first embodiment. A detailed operation of the storage bus 20 is described with reference to FIG. 7 and FIG. 8.

First, description is made to a principle for improving the efficiency in the second embodiment. Referring to FIG. 7, the write operations in the hard disk units 5A and 5B are divided into a seek operation and an "actual write operation". The actual write operation means a net write operation which does not include seek operation. In FIG. 7, a time is represented by a reference numeral which is different from that of FIG. 5 and FIG. 8. To be more clearly indicative of a difference between FIG. 7 and FIGS. 5 and 8. Abscissa in FIG. 7 designates times $u_0$–$u_6$, and a time length between a time $u_0$ and a time $u_1$ is called one unit. Moreover, the video data segments $a_1, a_2, \ldots, b_1, b_2 \ldots, c_1, c_2, \ldots, d_1, d_2, \ldots$ in FIG. 6 are called "blocks".

Since a seek time is constant, a time length which is required to write is proportional to a data amount. It is provided that a time length required to seek operation is one unit and a time length required to write one block is two units. A time length for writing continuously two blocks is four units.

In the case that the write operation of the block is carried out one by one, a seek operation, a write operation 1, a seek operation and a write operation 2 are carried out in the named order between the time $u_0$ and the time $u_6$. Therefore, the six units are required. On the other hand, when the write operation of the block is carried out two by two, the seek operation, the write operations 1 and 2 are carried out between the time $u_0$ and the time $u_5$. Therefore, five units are required. Consequently, the write operation is completed within five units which are smaller than six units. The above-mentioned operation is applicable to readout operation. The larger a data amount in one access is, the further an efficiency is improved.

Figure 8:
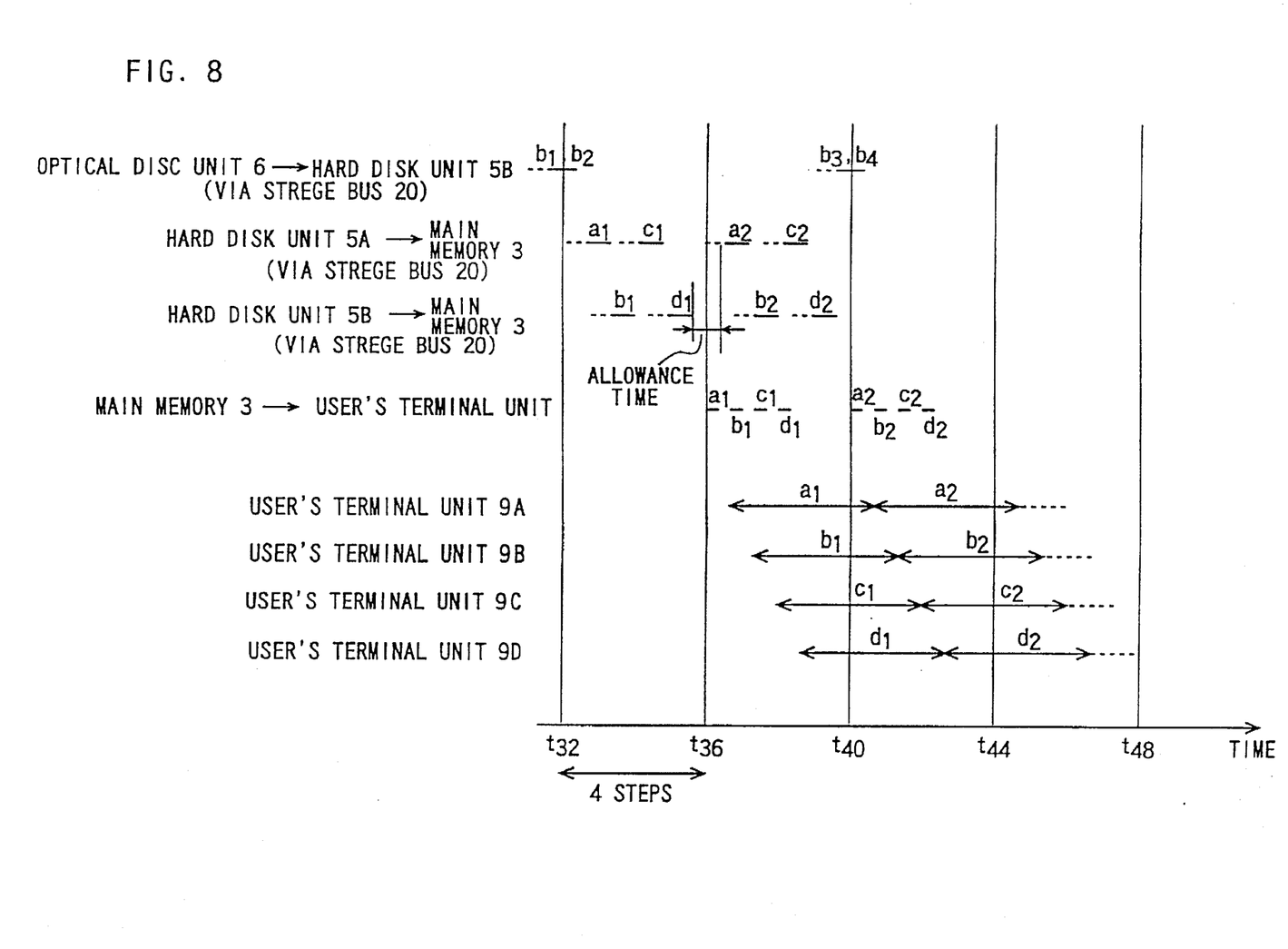
FIG. 8 is a timing chart of a detailed operation of the video server apparatus in accordance with the second embodiment in the present invention.

In the second embodiment, as shown in FIG. 8, a unit of write operation of the video data segments $b_1$ and $b_2$ which are transfer from the optical disc unit 6 to the hard disk unit 5B is larger than that of readout operation of the video data segments $a_1$–$d_1$. In the readout operation, one block must be read out in one step. For this purposes, N blocks are written in N steps (N is an integer of one or more). It is required that the video data must be supplied continuously to the user's terminal unit in readout operation. Therefore, one block must be read out in one step without fail. If the unit of readout operation is increased, a capacity of main memory 3 must be increased. If two blocks are read out in two steps, the capacity of the main memory 3 must be twice. On the other hand, the write operation is not restricted such as the readout operation.

A write operation of two blocks in two steps is described with reference to FIG. 8. The video data segments $b_1$ and $b_2$ are transferred from the optical disc unit 6 to the hard disk unit 5B before and after $t_{32}$, and written in the hard disk unit 5B. The video data segments $a_1$, $c_1$, $b_1$ and $d_1$ are read out from the hard disk unit 5A and 5B, and transferred to the main memory 3 between the time $t_{32}$ and the time $t_{36}$. The video data segments $a_2$, $c_2$, $b_2$ and $d_2$ are transferred to the main memory 3 between the time $t_{36}$ and the time $t_{40}$.

Consequently, an allowance time arises before and after the time $t_{36}$ by writing the video data segments $b_1$ and $b_2$ together to the hard disk unit 5B. The allowance time arises after readout of the video data segment $d_1$. Furthermore, it is possible to make a seek operation of the video data segment $a_2$ overlap with the readout operation of the video data segment d1. Consequently, an allowance time arises immediately after readout of the video data segment $a_2$. Therefore, one step in FIG. 8 can be shortened with respect to one step in FIG. 5 by these allowance times. An efficiency of the hard disk unit and the like is improved and a performance of all systems is also improved.

As mentioned above, according to the present embodiment, an efficient transfer of the video data is attainable and the video server apparatus having a high performance is realizable.

In the present invention, since a conventional personal computer is applicable for the processor 2 and hardwares of peripheral devices, a cost of the video server apparatus is reduced.

The hard disk units having a middle performance is provided between the optical disc unit which is inexpensive and slow but large in capacity and the output buffer memory of semiconductor devices which are expensive and fast but small in capacity. The capacity of the expensive output buffer memory can be reduced by temporarily storing the video and sound data in the hard disk unit. Consequently, the system cost can be reduced.

Moreover, an efficiency of the video server apparatus is improved by making the unit of write operation larger than the unit of readout operation of the hard disk unit. An overall performance in the system is also improved.

Consequently, the video server apparatus of a low cost having a high performance is realizable.

Although the present invention has been described in terms of the presently preferred embodiments, it is to be understood that such disclosure is not to be interpreted as limiting. Various alternations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A video server apparatus comprising:

a processor for controlling operation of said video server apparatus, a first interface apparatus connected to said processor and for transmitting data, a main memory connected to said first interface apparatus, a second interface apparatus connected to said first interface apparatus and for transmitting data, a memory apparatus of medium auto-changer type connected to said second interface apparatus for exchanging a memory medium, at least one middle memory apparatus connected to said second interface apparatus for temporarily storing data of said memory apparatus of medium auto-changer type, an input-output control unit connected to said second interface apparatus, an external line for connecting to said input-output control unit to user's terminal unit, said middle memory apparatus reading out said data from said memory apparatus of medium auto-changer type for temporarily storing, and then transferring said stored data to said main memory and to store therein, followed outputting to said external line via said input-output control unit, said memory medium of said memory apparatus of medium auto-changer type being exchanged every first period, data transferred from said middle memory apparatus to said main memory being changed every second period, data transferred from said main memory to said external line via said input-output control unit being switched every third period, and transfer of data from said memory apparatus of medium auto-changer type to said middle memory apparatus and transfer of data from said middle memory apparatus to said second interface apparatus being carried out by a time-division multiplex operation.

2. A video server apparatus in accordance with claim 1, wherein at least a part of image and sound data stored in said memory medium of the memory apparatus of medium auto-changer type are digitalized and compressed.

3. A video server apparatus in accordance with claim 1, wherein a memory capacity of said memory apparatus of medium auto-changer type is larger than that of said middle memory apparatus, the memory capacity of said middle memory apparatus is larger than that of said main memory, a write speed and a readout speed of data of said main memory are faster than a write speed and a readout speed of said middle memory apparatus, respectively, the write speed and the readout speed of said data of said middle memory apparatus are faster than a write speed and a readout speed of data of said memory apparatus of medium auto-changer type, respectively.

4. A video server apparatus in accordance with claim 1, wherein said memory apparatus of medium auto-changer type further comprises a shelf for storing a plurality of memory mediums and driver means for transferring data between an external line and said memory mediums, and handling means for exchanging said memory mediums by transferring said memory mediums between shelf and said driver means.

5. A video server apparatus in accordance with claim 1, wherein plural middle memory apparatus are disposed and each comprises hard disks which are more than the number of drivers of said memory apparatus of medium auto-changer type, and said main memory is configured by semiconductor device.

6. A video server apparatus comprising:

a processor for controlling operation of said video server apparatus, a first interface apparatus connected to said processor, a main memory connected to said first interface apparatus, a second interface apparatus connected to said first interface apparatus, a memory apparatus of medium auto-changer type connected to said second interface apparatus and being exchangeable memory medium, a middle memory apparatus connected to said second interface apparatus for temporarily storing data of said memory apparatus of medium auto-changer type, an input-output control unit connected to said second interface apparatus, an external line for connecting to said input-output control unit to users terminal units, said middle memory apparatus reading out data from said memory apparatus of medium auto-changer type for temporarily storing and then transferring said stored data to said main memory to store therein, followed by output to said external line via said input-output control unit, said memory medium of said memory apparatus of medium auto-changer type being exchanged every first period, data transferred from said middle memory apparatus to said main memory via said second interface apparatus and said first interface apparatus being changed every second period, said data transferred from said main memory to said external line via said input-output control unit being switched every third period, data transfer from said memory apparatus of medium auto-changer type to said middle memory apparatus and data transfer from said middle memory apparatus to said second interface apparatus being carried out by a time-division multiplex operation.

in definition of integers N, M and L being one or more, a unit of data transfer from said memory apparatus of medium auto-changer type to said middle memory apparatus being N blocks, a unit of data transfer from said middle memory apparatus to said second interface apparatus being M blocks, the data of N blocks being transferred in said first period, and data of M blocks being transferred in said second period, and said second period being L times of said first period, and said integer M being L times of said integer N.

7. A video server apparatus in accordance with claim 6, wherein a recording area of said middle memory apparatus comprises plural sections, and write and readout are alternately carried out in each section.

* * * * *